(12) United States Patent
Leucht et al.

(10) Patent No.: US 7,923,389 B2
(45) Date of Patent: Apr. 12, 2011

(54) INTUMESCENT BODY

(75) Inventors: Thomas Leucht, Münchberg (DE);
Hannes Obernosterer, Zug (CH)

(73) Assignee: Raymaster Holding Aktiengesellschaft, Aug (CH)

( * ) Notice: Subject to any disclaimer, the term of this patent is extended or adjusted under 35 U.S.C. 154(b) by 857 days.

(21) Appl. No.: 10/538,871

(22) PCT Filed: Dec. 17, 2003

(86) PCT No.: PCT/EP03/14399
§ 371 (c)(1),
(2), (4) Date: Aug. 18, 2005

(87) PCT Pub. No.: WO2004/058902
PCT Pub. Date: Jul. 15, 2004

(65) Prior Publication Data
US 2006/0057915 A1    Mar. 16, 2006

(30) Foreign Application Priority Data
Dec. 20, 2002  (DE) .................. 102 61 213

(51) Int. Cl.
*B32B 5/02* (2006.01)
*C08K 3/32* (2006.01)
(52) U.S. Cl. .................. 442/138; 442/143; 524/416
(58) Field of Classification Search .................. 442/138, 442/143; 524/416
See application file for complete search history.

(56) References Cited

U.S. PATENT DOCUMENTS

| | | | | |
|---|---|---|---|---|
| 4,774,268 A | * | 9/1988 | Marx et al. | 523/179 |
| 5,749,948 A | * | 5/1998 | Scholz et al. | 106/18.15 |
| 6,248,820 B1 | | 6/2001 | Nozaki et al. | |
| 6,284,343 B1 | * | 9/2001 | Maples et al. | 428/97 |
| 6,617,382 B1 | * | 9/2003 | Pirig et al. | 524/115 |

FOREIGN PATENT DOCUMENTS

| | | |
|---|---|---|
| DE | 38 01 456 A1 | 8/1988 |
| DE | 40 41 470 A1 | 6/1992 |
| DE | 43 43 664 A1 | 6/1995 |
| DE | 43 43 668 A1 | 6/1995 |
| DE | 196 08 612 C2 | 9/1997 |
| DE | 197 51 434 A1 | 7/1999 |
| EP | 0 669 418 A1 | 8/1995 |
| EP | 1 048 778 A1 | 11/2000 |
| WO | 00/56839 | 9/2000 |

OTHER PUBLICATIONS

DE-GM 73 23 454.

\* cited by examiner

*Primary Examiner* — Hai Vo
(74) *Attorney, Agent, or Firm* — Manabu Kanesaka

(57) ABSTRACT

The invention relates to an intumescent body, made from a non-intumescent polymer material providing the form of the body and a coating material applied to the polymer material. According to the invention, the polymer material together with the coating material provides an intumescent system in which the polymer material forms a carbon-donor material.

12 Claims, 4 Drawing Sheets

INTUMESCENT BODY

RELATED APPLICATIONS

The present application is based on International Application No. PCT/EP2003/14399 filed Dec. 17, 2003, and claims priority from, German Application Numbers 102 61 213.7 filed Dec. 20, 2002 and Jan. 10, 2002, respectively, the disclosures of which are hereby incorporated by reference herein in its entirety.

FIELD OF THE INVENTION

The invention relates to an intumescent body.

BACKGROUND OF THE INVENTION

The invention generally relates to the area of flame retarding, intumescent materials or masses. Flame retarding, intumescent masses are, among others, synthetic resins provided with a foaming agent and a flame retarding agent or aqueous synthetic resin dispersions which create a carbon foam when heat is applied. The synthetic resin is primarily used as carbon donor. The carbon foam has a 10 to 100-fold volume in comparison to the original thickness of the coating mass. Due to its very low heat conducting capacity, the foam protects a material which is coated with it from the effects of flames.

DE 197 51 434 A1 describes an intumescent body of this type. The body is made from a non-intumescent polymer material providing the form of the body, a synthetic material for example, and an intumescent coating mass applied to the polymer material. Due to its lack of sufficient transparency, the known coating mass is not particularly suitable for the coating of printed textiles.

From DE 38 01 465 A1 a method is known for the making of polyurethane masses equipped with flame retardant. Halogen and/or heavy metal compounds are not added since these generate gases during a fire which are injurious to health.

DE 40 41 470 A1 describes an intumescent textile for which a layer of a grainy intumescent agent is provided between two textile areas which are connected together.

From DE 43 43 668 A1, an intumescent, flame retarding coating mass is known to which is added, among others, ammonium polyphosphate as flame retarding agent. Furthermore, the coating mass contains melamine as the foaming agent. Due to its lack of transparency, the known coating mass is not suitable for coating printed textiles.

DE 196 08 612 C2 discloses a flame retarding, intumescent coating mass which contains epoxy resin as synthetic resin. The coating mass contains solvents; up to 65 weight % can be added as fillers. This coating mass is also not suitable for coating textiles.

To ensure sufficient effectiveness, intumescent coating masses must be applied in a sufficiently thick layer to the body to be protected. This increases the weight of the body. Such an increase in weight is undesirable particularly for bodies used in the aviation industry or for textiles. Regardless of this, the manufacturing of conventional, intumescent coating masses requires the provision and processing of a plurality of different components. This increases manufacturing expense which is undesirable. Finally, conventional, intumescent coating masses have none or only slight transparency. This places significant restrictions on the surface design of bodies to be coated with intumescent masses.

SUMMARY OF THE INVENTION

The object of the invention is to remove the disadvantages according to the state of technology. In particular an intumescent system is to be specified which has as low a weight as possible and furthermore is simple and inexpensive to make. In addition, a coating mass of the intumescent system is to have as high a degree of transparency as possible so that for example an imprint provided on a surface of the body is not adversely affected.

According to the invention, it is provided that, together with the coating mass, the polymer material provides an intumescent system with which the polymer material generates a carbon-donor component.—Contrary to the state of technology, the components of the intumescent system are no longer exclusively contained in a substance or a mass with intumescent properties. An essential share of the carbon necessary for the flame retarding effect according to the intumescence principle is provided by the polymer material coated with the coating mass. Due to this, the separate addition of a carbon-donor component to the coating mass is not necessary. Such a coating mass without carbon-donor component can be made with excellent transparency. To achieve an intumescent effect, the coating mass must only be applied with a thin layer. The polymer material coated with the coating mass is particularly light in weight. It is particularly suitable for the manufacturing of textiles, components for automotive vehicles, aircraft, ships, etc.

According to an advantageous embodiment, the polymer material has a carbon content of $\geq 20$ weight %. Such polymer materials are particularly suitable as part of the intumescent system. The polymer material can provide a share of at least 20 weight % of the carbon in the intumescent system. However, it is useful that the polymer material provides a higher share of carbon, preferably at least 30 weight % and particularly preferably at least 40 weight %. The coating mass also contains carbon and is also to this extent a carbon donor. However, an essential share of carbon in the intumescent system is provided by the polymer material. The amount of carbon provided by the polymer material can be determined by examining a foam which was created after flame treatment to determine its carbon content. When the amount of carbon provided by the coating mass is deducted from the determined carbon content, the amount of carbon supplied by the polymer material is obtained.

It has been shown that in particular such polymer materials are suitable as part of the intumescent system provided by the invention which have a difference $\Delta T$ between a melting point temperature $T_s$ and a crystallization temperature $T_c$ of the polymer material $\geq 40$ K. According to an embodiment, the difference $\Delta T$ is in the range of 40 to 80 K, preferably in the range of 45 to 75 K, particularly preferably in the range of 50 or 55 to 70 K. The crystallization temperature $T_c$ is usefully $\leq 200°$ C., preferably $\leq 190°$ C. Further, it has been shown to be useful to select the polymer material so that the melting temperature $T_s$ is in the range of 50° C. to 400° C. or a decomposition temperature in the range of 100° C. to 500° C. It has been shown that polymer materials with the aforementioned physical properties are particularly well suited as carbon-donor components in the intumescent system as provided by the invention. It has been observed, particularly with such polymer materials, that the coating mass penetrates the interior of the polymer material during a fire and flame-extinguishing foam is created with the aid of the polymer material. Experiments have shown that polymer materials, which have a difference $\Delta T$ of significantly less than 40 K between their melting temperature $T_s$ and their crystallization temperature $T_c$, are less suitable as components for the intumescent system.—The polymer material can be selected from the following group: polyester, polyamide, polyacrylate, polyurethane, polyacrylonitrile, aramids and derivatives of the aforementioned polymers.

In accordance with a further embodiment, the intumescent system is a halogen-free and/or heavy metal-free system. Such a system does not develop gases during a fire which are particularly injurious to health.

Conventional coating masses can always be used as coating mass, wherein, however, the separate addition of a carbon-donor component can be omitted. The coating mass advantageously contains a flame retarding agent. A coating mass with the following composition has been shown to be particularly suitable for the intumescent system provided by the invention:

25 to 95 weight % of an aqueous dispersion containing polyurethane or polyacrylate,
0.5 to 10 weight % of an isocyanate or a melamine-formaldehyde and
3 to 15 weight % of a flame retarding agent.

In the hardened state, the suggested coating mass has an excellent transparency. The coating mass is particularly suitable to the waterproofing or coating of textiles made of synthetic organic fibers. The optical appearance of the textile or an imprint on same is in no way adversely affected by the coating mass provided by the invention. On the contrary, an excellent brilliance is created which allows the color of the textile or an imprint on same to appear even more attractive.

The synthetic organic fibers which make up the textile serve in this case as carbon donors in the intumescent system. Contrary to the state of technology, a component providing the carbon donor in the coating mass can be omitted. According to this invention, the coating mass is formed so that it generates an intumescent textile in combination with synthetic organic fibers. In comparison to the state of technology, this drastically reduces the grams per square meter weight of the textile. Together with the synthetic organic fibers, the coating mass has an excellent flame retarding effect. It is particularly suitable for coating textiles such as curtains, tarpaulins, sunshades, tents, awnings, pieces of clothing and similar.

The generation of a flame retarding carbon foam is particularly due to the addition of the isocyanate or melamine-formaldehyde acting as the cross-linking agent. When thermoplastic organic fibers are used, further cross-linking is achieved when the fibers are softened under the effects of the heat. According to the current state of knowledge, this makes an essential contribution to the generation of a stable carbon foam.

According to an advantageous embodiment, the flame retarding agent is an acid donor, in particular an ammonium polyphosphate. In addition, 0.1 to 1.0 weight % of an agent can be contained for deaerating. This can further improve the transparency of the coating created by the coating mass.

In addition, 0.1 to 1.5 weight % of an insecticide and/or a bactericide can also be included. This increases the life of the textile.

The polymer material can be in the form of fibers or woven cloth or knitted fabric made thereof. Apart from this, other bodies which create a form from the polymer material can also be made. This can be, for example, the interior coverings inside of motor vehicles, aircraft or ships, the housing of electronic or electro-technical devices, the components from building construction, for example, ventilation tubes, window frames, cable ducts or similar, components of furniture, etc.

In further accordance to the invention, a non-intumescent polymer material which provides the form of a body is used as carbon-donor component of an intumescent system. The phrase "a polymer material which provides the form of a body" is used to mean a polymer material which is present in solid form and is suitable for use as a substrate for the coating with a coating mass. The polymer material can be fibers, woven cloth, knitted fabric or parts.

According to an advantageous embodiment, further components of the intumescent system can be contained in a coating mass applied to the polymer material. The intumescent system suggested by the invention thus consists of at least two different substances of which one is the polymer material and the other is the coating mass.

Due to the advantageous embodiment of the use, reference is made to the aforementioned features which also apply accordingly to the use.

BRIEF DESCRIPTION OF THE DRAWING

Examples will now be used to describe the invention in more detail based on the drawings. The figures are listed below:

| FIG. 1 | a thermal analysis of the heating up of a blue textile, |
|---|---|
| FIG. 2 | a thermal analysis of the cooling off of the blue textile, |
| FIG. 3 | a thermal analysis of the heating up of a green textile and |
| FIG. 4 | a thermal analysis of the cooling off of the green textile. |

DETAILED DESCRIPTION OF THE INVENTION

The results shown in FIG. 1 to 4 are the results of a dynamic thermal analysis according to the procedure of "Differential Scanning Calorimetry" (DSC). The thermal analyses were performed using the following temperature program:

| Rate of heat up: | 10° C./min |
|---|---|
| Starting temperature: | 25° C. |
| Maximum temperature: | 300° C. |
| Holding time at maximum temperature: | 3 min |

The green textile weighed 5.41 mg. The blue textile weighed 4.5 mg. Both the blue and the green textile are textiles which were made from polyester fibers. The polyester fibers were not been coated with a coating mass. The examined polyester fibers are polyester fibers with a different composition.

Figure 1:
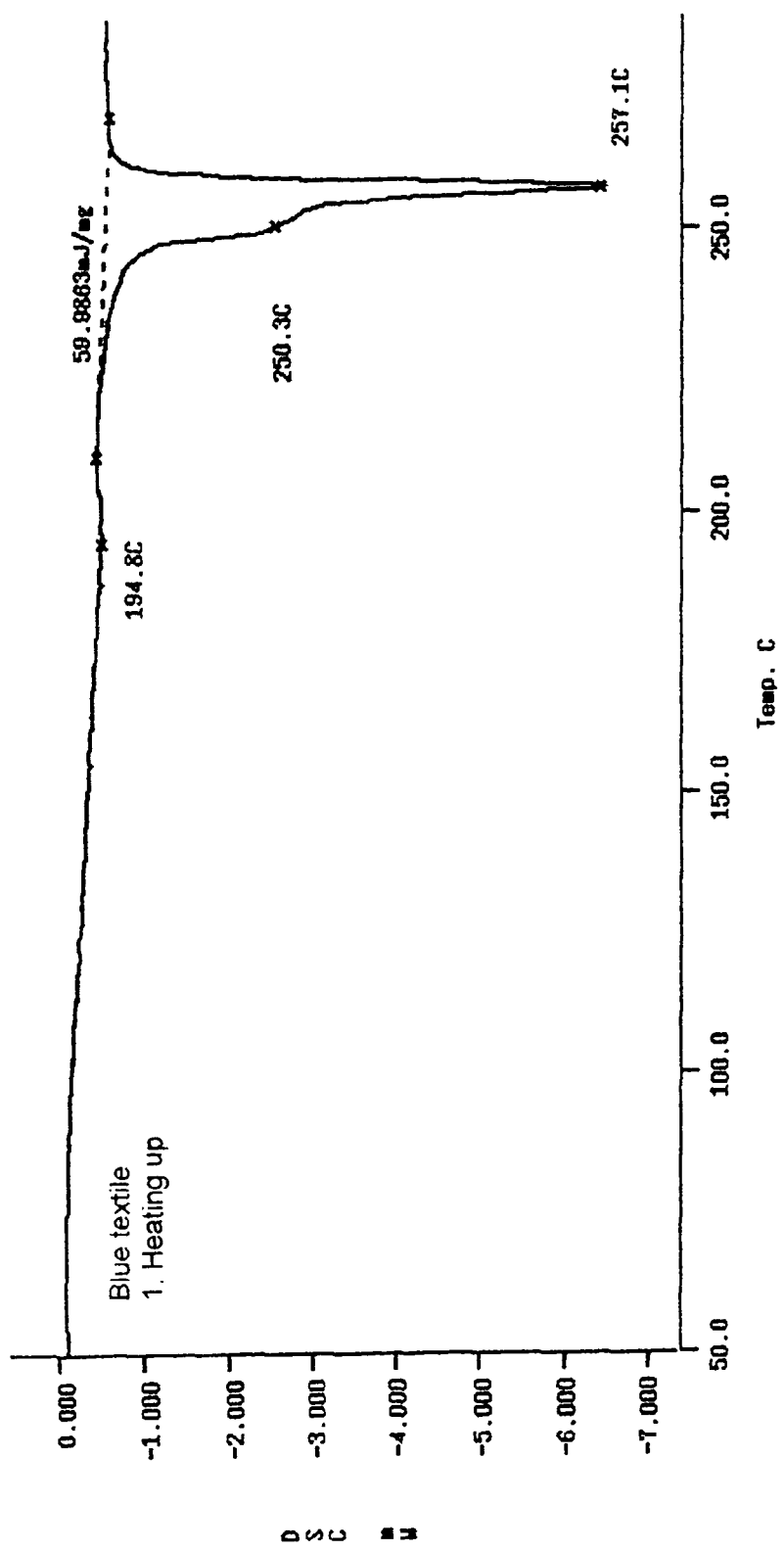
Figure 2:
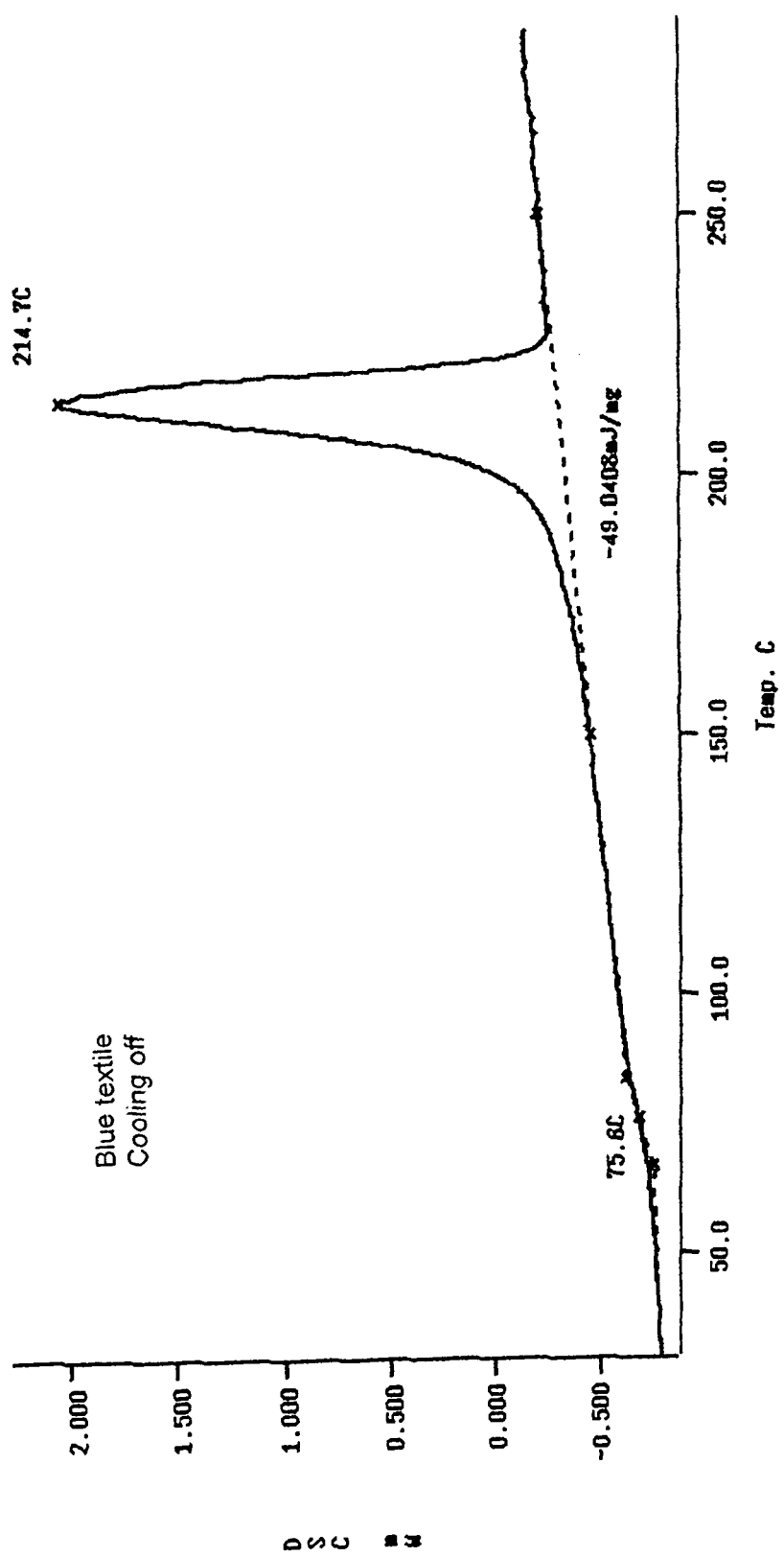

FIG. 1 shows that the polyester fiber labeled as blue textile has a melting temperature $T_s$ of approximately 257° C. As FIG. 2 shows, the crystallization temperature $T_c$ is approximately 215° C. A difference $\Delta T$ between the melting temperature $T_s$ and the crystallization temperature $T_c$ is in this case approximately 42° C.

Figure 3:
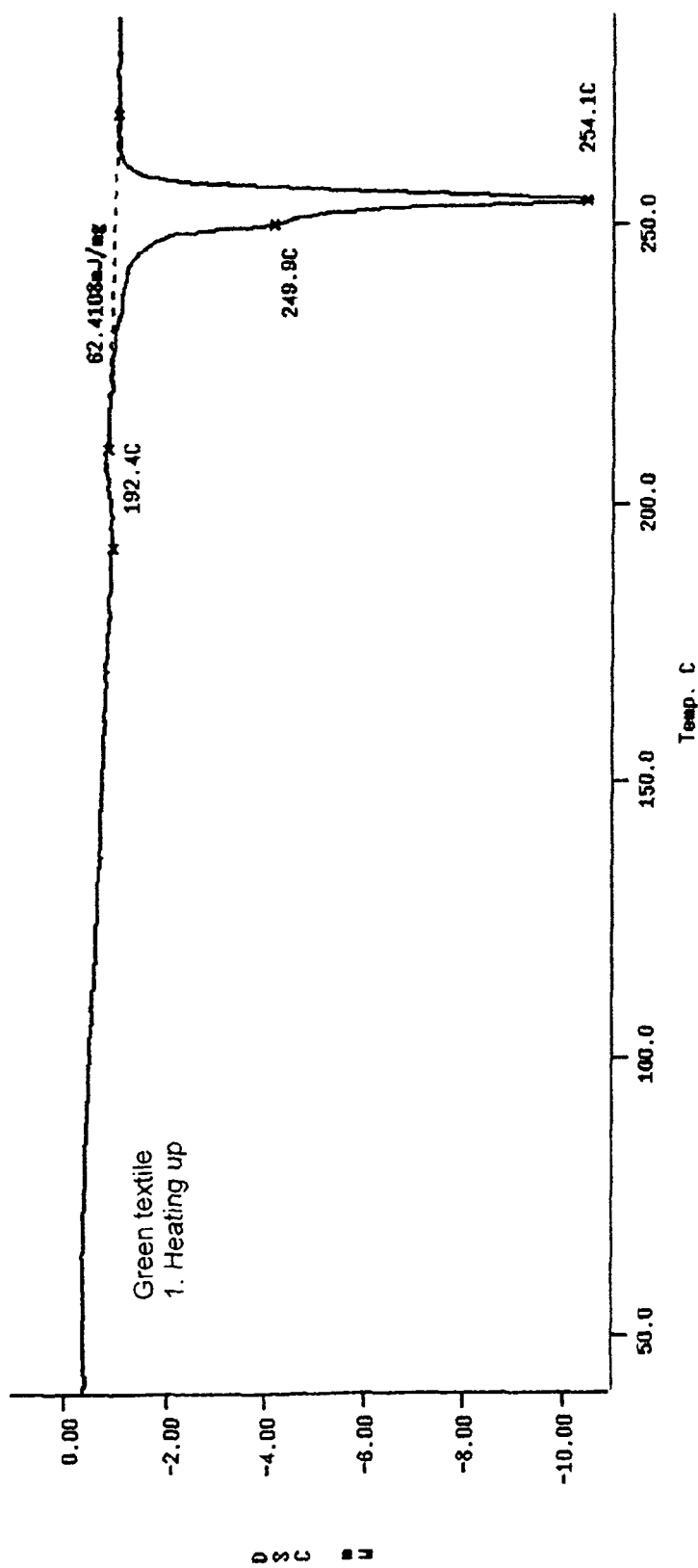
Figure 4:
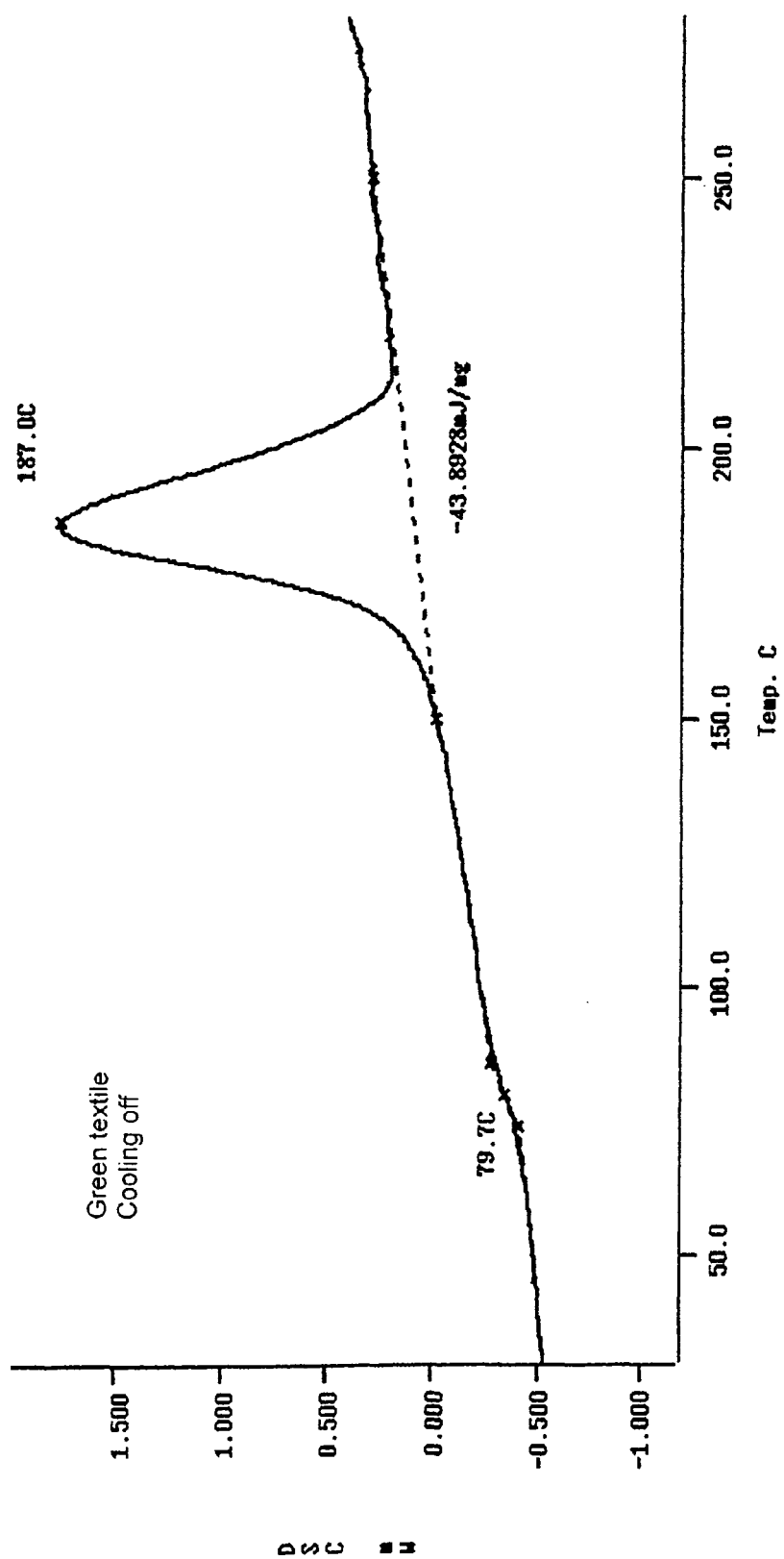

As shown in FIGS. 3 and 4, the polymer material labeled as green textile has a melting temperature $T_s$ of 254° C. and a crystallization temperature of only 187° C. Here the difference $\Delta T$ between the melting temperature $T_s$ and the crystallization temperature $T_c$ is 67° C.

During further experiments, the polymer materials labeled as green and blue textile were coated with coating masses of the following compositions:

| Coating mass A (=basic mass) | | | | |
|---|---|---|---|---|
| Weight in g | Chemical Composition | Brand Name | Supplier | Purpose |
| 80 | Polyurethane | Impranil DLS | Bayer AG | Binding agent |
| 20 | Water | | | |
| 0.5 | Polysiloxane | Agitan 256 | Münzing Chemie GmbH | Defoaming agent |
| 1.5 | Polyurethane | Tafigel PUR 61 | Münzing Chemie GmbH | Thickener |

The aforementioned mass forms a basic mass which is used to produce intumescent coating masses. Additional components can be added to the basic mass, for example fungicides and similar. 1 g Chinone AF of the company Bode Chemie Hamburg can be added, for example, as fungicide to the basic mass.

| Coating mass B | | | | |
|---|---|---|---|---|
| Weight in g | Chemical Composition | Brand Name | Supplier | Purpose |
| 100 | Basic mass | | | |
| 6 | Ammonium polyphosphate | Exolit AP 462 | Clariant Chemie | Acid donor |

| Coating mass C | | | | |
|---|---|---|---|---|
| Weight in g | Chemical Composition | Brand Name | Supplier | Purpose |
| 100 | Basic mass | | | |
| 6 | Ammonium polyphosphate | Exolit AP 462 | Clariant Chemie | Acid donor |
| 2 | Isocyanate | Desmodur DA | Bayer AG | Cross-linking agent |

| Coating mass D | | | | |
|---|---|---|---|---|
| Weight in g | Chemical Composition | Brand Name | Supplier | Purpose |
| 100 | Basic mass | | | |
| 6 | Ammonium polyphosphate | Exolit AP 462 | Clariant Chemie | Acid donor |
| 15 | Melamine | | CSC Jäckle Chemie GmbH | Foaming agent |
| 2 | Isocyanate | Desmodur DA | Bayer AG | Cross-linking agent |

| Coating mass E | | | | |
|---|---|---|---|---|
| Weight in g | Chemical Composition | Brand Name | Supplier | Purpose |
| 100 | Basic mass | | | |
| 6 | Ammonium polyphosphate | Exolit AP 462 | Clariant Chemie | Acid donor |
| 15 | Melamine | | CSC Jäckle Chemie GmbH | Foaming agent |
| 2 | Isocyanate | Desmodur DA | Bayer AG | Cross-linking agent |
| 20 | Pentaerythrite | | CSC Jäckle Chemie GmbH | Carbon donor |

Coating masses A to E were applied to both the blue and the green textile in an amount of 85 g/m$^2$, namely using an air knife at a speed of 8 m/min. For drying and fixation, the textile covered with the coating mass was treated thermally as follows:

Heating up to 100° C., holding time of 2 min,
Heating up to 130° C., holding time of 1 min,
Heating up to 150° C., holding time of 1 min.

The thus coated polymer materials were then subjected to a flame test in accordance with the standard DIN 4102-B2 which is valid in Germany. The following parameters were used for this:

| | |
|---|---|
| Gas: | Propane |
| Exhaust speed: | 0.7 m/s |
| Flame height: | 20 mm |
| Distance textile/flame: | 16 mm |
| Flaming time: | 15 s |

Using coating masses A to E according to the aforementioned tables during the flame test according to DIN 4102-B2, the results shown in the following table were obtained for the green textile:

| Material Flame | Edge Test Lengthwise Direction*) | | | | | Edge Test (Crosswise Direction*) | | | | |
|---|---|---|---|---|---|---|---|---|---|---|
| Recipe no. | A | B | C | D | E | A | B | C | D | E |
| Reaches the measuring mark 1) | 15 | 17 | ./. | ./. | ./. | 17 | 18 | ./. | ./. | ./. |
| Self-extinguishing of the flames, end of the afterburning | 42 | 35 | 14 | 12 | 12 | 38 | 33 | 10 | 10 | 12 |

*)Time specified in seconds starting at beginning of experiment
./. No occurrence of the event It is shown that, already with coating mass C, the green textile fulfils the criteria of the flame test according to the standard DIN 4102-B2. The coating mass C contains no addition of a carbon donor. The results of the experiment clearly show that, corresponding to the invention's teaching, in particular a carbon donor in the coating mass can be omitted when a suitable polymer material is used to make the intumescent system.

The following tables list the results which were obtained with the green and blue textiles coated with coating mass C during the fire protection test according to DIN 4102-B1:

| Experiment Parameter | Textile, Blue *) | Textile, Green *) |
|---|---|---|
| Reaches measuring mark 1/edge test, lengthwise direction | 13 | ./. |
| Reaches measuring mark 1/edge test, crosswise direction | 17 | ./. |
| End of the afterburning/edge test, lengthwise direction | 60 | 14 |
| End of the afterburning/edge test, crosswise direction | 45 | 10 |

*) Time specified in seconds starting at beginning of experiment
./. No occurrence of the event In a further experiment, a further polymer material was examined. This is a woven cloth made of polyamide with a grams per square meter weight of 60 g/m².

Under the aforementioned coating conditions, the polyamide woven cloth was coated with the coating masses A1 to E1 described in the following tables in the amount of 85 g/m².

| | Coating mass A1 (=basic mass 1) | | | |
|---|---|---|---|---|
| Weight in g | Chemical Composition | Brand Name | Supplier | Purpose |
| 80 | Polyurethane | Impranil DLF | Bayer AG | Binding agent |
| 20 | Water | | | |
| 0.5 | Polysiloxane | Agitan 256 | Münzing Chemie GmbH | Defoaming agent |
| 1.5 | Polyurethane | Tafigel PUR 61 | Münzing Chemie GmbH | Thickener |

The aforementioned mass forms a basic mass 1 which is used to make intumescent coating masses. Additional components can be added to the basic mass, for example fungicides and similar. 1 g quinone AF of the company Bode Chemie Hamburg can be added, for example, as fungicide to the basic mass.

| | Coating mass B1 | | | |
|---|---|---|---|---|
| Weight in g | Chemical Composition | Brand Name | Supplier | Purpose |
| 100 | Basic mass | | | |
| 6 | Ammonium polyphosphate | Exolit AP 462 | Clariant Chemie | Acid donor |

| | Coating mass C1 | | | |
|---|---|---|---|---|
| Weight in g | Chemical Composition | Brand Name | Supplier | Purpose |
| 100 | Basic mass 1 | | | |
| 6 | Ammonium polyphosphate | Exolit AP 462 | Clariant Chemie | Acid donor |
| 2 | Isocyanate | Desmodur DA | Bayer AG | Cross-linking agent |

| | Coating mass D1 | | | |
|---|---|---|---|---|
| Weight in g | Chemical Composition | Brand Name | Supplier | Purpose |
| 100 | Basic mass 1 | | | |
| 6 | Ammonium polyphosphate | Exolit AP 462 | Clariant Chemie | Acid donor |
| 15 | Melamine | | CSC Jäckle Chemie GmbH | Foaming agent |
| 2 | Isocyanate | Desmodur DA | Bayer AG | Cross-linking agent |

| | Coating mass E1 | | | |
|---|---|---|---|---|
| Weight in g | Chemical Composition | Brand Name | Supplier | Purpose |
| 100 | Basic mass 1 | | | |
| 6 | Ammonium polyphosphate | Exolit AP 462 | Clariant Chemie | Acid donor |
| 15 | Melamine | | CSC Jäckle Chemie GmbH | Foaming agent |
| 2 | Isocyanate | Desmodur DA | Bayer AG | Cross-linking agent |
| 20 | Pentaerythrite | | CSC Jäckle Chemie GmbH | Carbon donor |

Under the afore-described conditions, the polyamide woven cloth which was coated with the coating masses A1 to E1 was subjected to a flame test according to DIN 4102-B2. During this test, the results shown in the following table were obtained:

| Material Flame | Edge Test Lengthwise Direction*) | | | | | Edge Test (Crosswise Direction*) | | | | |
|---|---|---|---|---|---|---|---|---|---|---|
| Recipe no. | A1 | B1 | C1 | D1 | E1 | A1 | B1 | C1 | D1 | E1 |
| Reaches the measuring mark 1) | 12 | 15 | ./. | ./. | ./. | 17 | 18 | ./. | ./. | ./. |
| Self-extinguishing of the flames, end of the afterburning | 33 | 37 | 12 | 10 | 10 | 38 | 33 | 8 | 12 | 10 |

*)Time specified in seconds starting at beginning of experiment
./. No occurrence of the event The results clearly show that polyamide is also suitable as polymer material to make the intumescent system provided by the invention. Also when polyamide is used, it is sufficient to coat the polymer material with the coating mass C1 to obtain a sufficient intumescent effect. In particular, an addition of foaming agent and carbon-donor in the coating mass can be omitted.

In a further experiment, a woven cloth made of polyacrylate super-absorber fiber "Oasis type 102" with a grams per square meter weight of 90 g/m² was used as the polymer material. This woven cloth was coated under the aforementioned conditions with coating masses A2 to E2 described in the following tables in an amount of 65 g/m²:

Coating mass A2 (=basic mass 2)

| Weight in g | Chemical Composition | Brand Name | Supplier | Purpose |
|---|---|---|---|---|
| 100 | Polyurethane | Impranil ELH | Bayer AG | Binding agent |

The aforementioned mass forms a basic mass 2 which is used to make intumescent coating masses. Additional components, such as fungicide and similar, can be added to the basic mass 2.

Coating mass B2

| Weight in g | Chemical Composition | Brand Name | Supplier | Purpose |
|---|---|---|---|---|
| 100 | Basic mass 2 | | | |
| 6 | Ammonium polyphosphate | Exolit AP 462 | Clariant Chemie | Acid donor |

Coating mass C2

| Weight in g | Chemical Composition | Brand Name | Supplier | Purpose |
|---|---|---|---|---|
| 100 | Basic mass 2 | | | |
| 6 | Ammonium polyphosphate | Exolit AP 462 | Clariant Chemie | Acid donor |
| 2 | Isocyanate | Additive Z | Bayer AG | Cross-linking agent |

Coating mass D2

| Weight in g | Chemical Composition | Brand Name | Supplier | Purpose |
|---|---|---|---|---|
| 100 | Basic mass 2 | | | |
| 6 | Ammonium polyphosphate | Exolit AP 462 | Clariant Chemie | Acid donor |
| 15 | Melamine | | CSC Jäckle Chemie GmbH | Foaming agent |
| 2 | Isocyanate | Additive Z | Bayer AG | Cross-linking agent |

Coating mass E2

| Weight in g | Chemical Composition | Brand Name | Supplier | Purpose |
|---|---|---|---|---|
| 100 | Basic mass 2 | | | |
| 6 | Ammonium polyphosphate | Exolit AP 462 | Clariant Chemie | Acid donor |
| 15 | Melamine | | CSC Jäckle Chemie GmbH | Foaming agent |
| 2 | Isocyanate | Additive Z | Bayer AG | Cross-linking agent |
| 20 | Pentaerythrite | | CSC Jäckle Chemie GmbH | Carbon donor |

The samples made from polyacrylate super-absorber fiber "Oasis type 102" covered with the coating masses A2 to E2 were in turn subjected to the flame test according to DIN 4102-B2. The results obtained thereof are listed in the following table:

| Material Flame Recipe no. | Edge Test Lengthwise Direction*) | | | | | Edge Test (Crosswise Direction*) | | | | |
|---|---|---|---|---|---|---|---|---|---|---|
| | A2 | B2 | C2 | D2 | E2 | A2 | B2 | C2 | D2 | E2 |
| Reaches the measuring mark 1) | 17 | 16 | ./. | ./. | ./. | 16 | 16 | ./. | ./. | ./. |
| Self-extinguishing of the flames, end of the afterburning | 44 | 39 | 6 | 7 | 6 | 35 | 34 | 8 | 7 | 7 |

*)Time specified in seconds starting at beginning of experiment
./. No occurrence of the event The results show that polyacrylate super-absorber fiber "Oasis type 102" is also a suitable polymer material which can be combined into an intumescent system with a simply composed coating mass C2. Also when this polymer material is used, it is not necessary to add a carbon-donor to the coating mass.

The coating masses C, C1, and C2 have excellent transparency. An imprint applied to the textile appears brilliant and is visible without any adverse effects. This even applies to an imprint which is visible on both sides of the textile. The textile has a grams per square meter weight of less than 300 g/m². When heat or flames are applied, the material foams and creates a carbon foam which suppresses further flame development.

Since the suggested intumescent textile uses the material which provides the textile itself as carbon donor for the making of a carbon foam when flames are applied, a significant reduction of the grams per square meter weight can be achieved. The intumescent features are nevertheless excellent.

The invention claimed is:
1. An intumescent body comprising:
   a non-intumescent polymer material providing a form of the body; and
   a substantially transparent coating mass applied to a surface of the polymer material, the coating mass comprising:
      25 to 95 weight % of an aqueous dispersion containing polyurethane or polyacrylate;
      0.5 to 10 weight % of an isocyanate or a melamine-formaldehyde; and
      3 to 15 weight % of ammonium polyphosphate as a flame retarding agent;
   wherein the coating mass, together with the polymer material, results in an intumescent system, in which during a fire, the coating mass penetrates an interior of the polymer material creating with an aid of the polymer material, which provides an essential share of a carbon-donor component of the intumescent system, a flame extinguishing foam.
2. Intumescent body as defined in claim 1, wherein the polymer material has a carbon content of $\geq 20$ weight %.
3. Intumescent body as defined in claim 1, wherein the polymer material provides a share of at least 20 weight % of the carbon in the intumescent system.

4. Intumescent body as defined in claim 1, wherein a difference $\Delta T$ between a melting temperature $T_s$ and a crystallization temperature $T_c$ of the polymer material is $\geqq 40$ K.

5. Intumescent body as defined in claim 1, wherein a difference $\Delta T$ is in the range of 40 to 80 K.

6. Intumescent body as defined in claim 4, wherein the crystallization temperature $T_c$ is $\leqq 200°$ C.

7. Intumescent body as defined in claim 1, wherein the polymer material has a melting temperature Ts in the range of 50° C. to 400° C. or a decomposition temperature in the range of 150° C. to 500° C.

8. Intumescent body as defined in claim 1, wherein the intumescent system is at least one of a halogen-free and heavy metal-free system.

9. Intumescent body as defined in claim 1, wherein the polymer material is selected from the following group consisting of polyester, polyamide, polyacrylate, polyurethane, polyacrylonitrile, aramids and derivatives of the afore-mentioned polymers.

10. Intumescent body as defined in claim 1, further comprising 0.1 to 1.0 weight % of an agent for deaeration.

11. Intumescent body as defined in claim 1, further comprising 0.1 to 1.5 weight % of at least one of an insecticide and a bactericide.

12. Intumescent body as defined in claim 1, wherein the polymer material is present in the form of fibers, or woven cloth, or knitted fabric, made thereof.

\* \* \* \* \*